(12) United States Patent
Inoguchi

(10) Patent No.: US 11,237,115 B2
(45) Date of Patent: **\*Feb. 1, 2022**

(54) APPEARANCE INSPECTION DEVICE AND BLISTER PACKAGING MACHINE

(71) Applicant: CKD CORPORATION, Aichi (JP)

(72) Inventor: Tadashi Inoguchi, Aichi (JP)

(73) Assignee: CKD CORPORATION, Aichi (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 16/792,603

(22) Filed: Feb. 17, 2020

(65) Prior Publication Data

US 2020/0182799 A1 Jun. 11, 2020

Related U.S. Application Data

(63) Continuation of application No. PCT/JP2018/015416.

(30) Foreign Application Priority Data

Aug. 24, 2017 (JP) .............................. JP2017-161202

(51) Int. Cl.
*G01N 21/85* (2006.01)
*G01N 21/86* (2006.01)
*G01N 21/88* (2006.01)

(52) U.S. Cl.
CPC ............. *G01N 21/85* (2013.01); *G01N 21/86* (2013.01); *G01N 21/8851* (2013.01)

(58) Field of Classification Search
CPC .... G01N 21/85; G01N 21/86; G01N 21/8851; G01N 21/8806; G01N 21/892; G01N 2201/102; G01B 11/30; B65B 11/52

(Continued)

(56) References Cited

U.S. PATENT DOCUMENTS

2004/0174518 A1\* 9/2004 Naiki ................. G01N 21/8806
356/237.2
2007/0160789 A1\* 7/2007 Merical ................. B32B 27/308
428/35.7

(Continued)

FOREIGN PATENT DOCUMENTS

EP 2693167 A2 2/2014
JP S6128845 A 2/1986

(Continued)

OTHER PUBLICATIONS

International Search Report issued in corresponding International Application No. PCT/JP2018/015416, dated Jul. 3, 2018, with translation (5 pages).

(Continued)

*Primary Examiner* — Tri T Ton
(74) *Attorney, Agent, or Firm* — Osha Bergman Watanabe & Burton LLP

(57) ABSTRACT

An appearance inspection device includes: a transparent conveyance body having a surface and a rear face and conveyed in a predetermined direction; an illumination device that irradiates with predetermined light an inspection area through which a plurality of objects pass, wherein the objects are arranged at predetermined intervals on a first face that is one of the surface and the rear face; a plurality of imaging devices each of which takes, along a predetermined direction, an image of part of side faces of the objects located in the inspection area, wherein the predetermined direction is inclined to both the surface and the rear face; and a processor that inspects an appearance of the side faces of the objects based on image data obtained by the imaging device.

8 Claims, 9 Drawing Sheets

(58) Field of Classification Search
USPC .................. 356/237.1–237.6, 239.1–239.8
See application file for complete search history.

(56) References Cited

U.S. PATENT DOCUMENTS

| | | | |
|---|---|---|---|
| 2009/0163377 A1* | 6/2009 | Alexandre | G01N 21/648 |
| | | | 506/9 |
| 2011/0127333 A1* | 6/2011 | Veksland | G06K 7/10722 |
| | | | 235/462.24 |
| 2014/0305073 A1 | 10/2014 | Monti | |
| 2020/0182800 A1* | 6/2020 | Inoguchi | G01N 21/9027 |

FOREIGN PATENT DOCUMENTS

| | | | |
|---|---|---|---|
| JP | H1130589 A | 2/1999 |
| JP | H11351828 A | 12/1999 |
| JP | 20163903 A | 1/2016 |
| JP | 2016148829 A | 8/2016 |
| WO | 2009002172 A1 | 12/2008 |

OTHER PUBLICATIONS

Written Opinion issued in corresponding International Application No. PCT/JP2018/015416, dated Jul. 3, 2018 (6 pages).
International Preliminary Report on Patentability issued in corresponding International Application No. PCT/JP2018/015416, dated Feb. 25, 2020, with translation (19 pages).

\* cited by examiner

APPEARANCE INSPECTION DEVICE AND BLISTER PACKAGING MACHINE

BACKGROUND

Technical Field

The present invention relates to an appearance inspection device configured to perform appearance inspection of an object and a blister packaging machine equipped with the appearance inspection device.

Description of Related Art

A generally known example of a blister package is A PTP sheet. The PTP sheet is comprised of a container film with pocket portions formed therein to contain objects such as tablets, and a cover film mounted to the container film such as to seal opening sides of the pocket portions.

This PTP sheet is manufactured through a process of forming pocket portions with conveying a belt-like container film, a process of filling objects into the pocket portions, a process of mounting a cover film to the container film to seal opening side of the pocket portions, and a process of separating a PTP sheet as a final product from a belt-like blister film formed by mounting the two films to each other.

In the process of manufacturing the PTP sheet, the object is inspected for any appearance abnormality, for example, adhesion of any foreign substance or dirt or the presence of any break or crack. In some cases, there has recently been a demand for appearance inspection with regard to a side face of the object.

With a view to enhancing the inspection efficiency, a known configuration of an appearance inspection device that inspects the side face of the object takes images of a plurality of objects that are conveyed in parallel, with a plurality of cameras placed in oblique directions relative to a conveying direction, so as to inspect the whole circumferences of the side faces of the plurality of objects (as described in, for example, Patent Literature 1).

PATENT LITERATURE

Patent Literature 1: JP S61-28845A

SUMMARY

In the case where images of a plurality of objects 100a, 100b and 100c conveyed in parallel are taken with a conventional camera 200 obliquely downward as shown in FIG. 10, however, the sizes of images of the plurality of objects 100a, 100b and 100c on obtained image data differ in proportion to the distances from the camera 200 as shown in FIG. 11, even when all the plurality of objects 100a, 100b and 100c actually have identical sizes. For example, the size of the image of the object 100a nearest to the camera 200 is significantly different from the size of the image of the object 100c farthest from the camera 200. This causes a difference in size of images of foreign substances or the like adhering to the objects 100a, 100b and 100c.

As a result, this causes a difference in resolution among the plurality of objects 100a, 100b and 100c or among a plurality of side face image data with regard to one object 100a or the like. This fails to maintain the uniformity of inspection and is likely to decrease the inspection accuracy.

As shown in FIG. 10, when the images of the plurality of objects 100a, 100b and 100c conveyed in parallel are taken with the conventional camera 200 obliquely downward, it may be difficult to place all the objects 100a, 100b and 100c within an in-focus range (depth of field).

As a result, partly out-of-focus image data (for example, image data including in-focus images of the objects 100a and 100b and an out-of-focus image of the object 100c among the plurality of objects 100a, 100b and 100c) may be obtained. This is likely to decrease the inspection accuracy.

Increasing the aperture value of the camera 200 (increasing the depth of field) allows all the objects 100a, 100b and 100c to be placed in the in-focus range but has difficulty in obtaining the sufficient light intensity required for inspection. This is likely to decrease the inspection accuracy. Especially in the case of imaging the objects 100a, 100b and 100c during conveyance with a view to enhancing the inspection efficiency, the exposure time is extremely short. The difficulty in obtaining the sufficient light intensity may become more significant in this case.

The above difficulty is not necessarily limited to PTP packaging but are inherent in the field of other blister packaging.

One or more embodiments of the present invention provide an appearance inspection device and a blister packaging machine that are configured to, for example, enhance the inspection efficiency and the inspection accuracy.

Functions and advantageous effects that are characteristic of one or more embodiments are also described as appropriate.

An appearance inspection device according to one or more embodiments comprises an irradiation unit (illumination device) configured to irradiate a predetermined inspection area with predetermined light, wherein a plurality of objects (for example, tablets) that are arranged at predetermined intervals on a first face side (for example, a surface side) of a transparent conveyance body (for example, a container film), which is one of a surface and a rear face of the transparent conveyance body conveyed in a predetermined direction, pass through in the predetermined inspection area; an imaging unit (imaging unit) configured to take an image of part of side faces of the plurality of objects located in the inspection area along a predetermined direction that is inclined to both the surface and the rear face of the transparent conveyance body; and an image processing unit (processor) configured to perform appearance inspection for at least the side faces of the plurality of objects, based on image data obtained by the imaging unit. A plurality of the imaging units are placed around the inspection area on at least a second face side (for example, a rear face side) that is opposite to the first face side out of the surface and the rear face of the transparent conveyance body, in plan view that is viewed in a direction perpendicular to the second face. The imaging unit comprises at least an imaging element; and an imaging optical system (for example, a lens unit) that is configured by an object-side telecentric optical system or a both-side telecentric optical system to form an image of the plurality of objects located in the inspection area, onto the imaging element. A light receiving face of the imaging element and a principal plane of the imaging optical system are set to satisfy Scheimpflug condition relative to the plurality of objects located in the inspection area.

In the appearance inspection device of one or more embodiments, the "side face of the object" means a region that is not visible or that is hardly visible when the objects arranged on the transparent conveyance body are viewed from the first face side or from the second face side along a direction perpendicular to both the surface and the rear face of the transparent conveyance body (the same applies in the subsequent embodiments).

Accordingly, the side face of the object is not strictly limited to a plane along the direction perpendicular to both the surface and the rear face of the transparent conveyance body but includes a curved face or the like. An object without a distinct side face, i.e., an object without differentiation between the surface and the side face (for example, a capsule or a soft capsule in an ellipsoidal shape or in a spherical shape) is also included in the object of inspection.

The appearance inspection device of one or more embodiments may be configured to inspect, for example, a region that is visible when the objects arranged on the transparent conveyance body are viewed from the first face side or from the second face side along the direction perpendicular to both the surface and the rear face of the transparent conveyance body but that has difficulty in appropriate appearance inspection, in addition to the "side face of the object". For example, a chamfered portion that is provided in a peripheral region of a surface or a rear face of a tablet (flat tablet) or a portion in the vicinity of a peripheral region of a curved surface or a curved rear face of a lens-shaped tablet may be specified as an object region of inspection.

The configuration of one or more embodiments enables appearance inspection to be performed simultaneously for the side faces of the plurality of objects located in the inspection area and thereby enhances the inspection efficiency.

The appearance inspection device of one or more embodiments is configured to take an image of the objects across the transparent conveyance body from the second face side that is opposite to the first face side where the objects are arrayed. This configuration suppresses a foreign substance or the like derived from the objects from adhering to the lens and the like of the imaging unit and thereby enhances, for example, the maintenance performance.

Additionally, in the appearance inspection device of one or more embodiments, the light receiving face of the imaging element and the principal plane of the imaging optical system are set to satisfy the Scheimpflug condition relative to the plurality of objects located in the inspection area. This configuration enables image data of an in-focus image of all the plurality of objects located in the inspection area to be obtained. As a result, this configuration increases the uniformity of inspection and enhances the inspection accuracy.

Furthermore, in the appearance inspection device of one or more embodiments, the imaging optical system is configured by the object-side telecentric optical system or the both-side telecentric optical system. This configuration causes the sizes of images of the plurality of objects formed on the imaging element (the sizes of the plurality of objects on the image data) to be substantially the same, irrespective of the distances between the imaging element and the plurality of objects. This configuration uniformizes the resolution among the plurality of objects or among a plurality of side face image data with regard to one object. As a result, this increases the uniformity of inspection and enhances the inspection accuracy.

The appearance inspection device of one or more embodiments enables the surface/rear face of the object to be imaged in addition to the side face of the object, depending on the type of the object or the set angle or the other configuration of the imaging unit. This accordingly allows for inspection of the surface/rear face as well as the side face of the object. As a result, there is no need to separately inspect the surface or the rear face of the object. This configuration accordingly shortens an overall time period required for the entire inspection and enhances the inspection efficiency.

An appearance inspection device according to one or more embodiments comprises an irradiation unit configured to irradiate a predetermined inspection area with predetermined light, wherein a plurality of objects (for example, tablets) that are arranged at predetermined intervals on a first face side (for example, a surface side) of a transparent conveyance body (for example, a container film), which is one of a surface and a rear face of the transparent conveyance body conveyed in a predetermined direction, pass through in the predetermined inspection area; an imaging unit configured to take an image of part of side faces of the plurality of objects located in the inspection area along a predetermined direction that is inclined to both the surface and the rear face of the transparent conveyance body; and an image processing unit configured to perform appearance inspection for at least the side faces of the plurality of objects, based on image data obtained by the imaging unit. A plurality of the imaging units are placed around the inspection area on at least a second face side (for example, a rear face side) that is opposite to the first face side out of the surface and the rear face of the transparent conveyance body, in plan view that is viewed in a direction perpendicular to the second face. The imaging unit comprises at least an imaging element; and an imaging optical system (for example, a lens unit) that is configured by an object-side telecentric optical system or a both-side telecentric optical system to form an image of the plurality of objects located in the inspection area, onto the imaging element. The imaging element and the imaging optical system are arranged such that all the plurality of objects located in the inspection area are placed in an in-focus range.

The configuration of one or more embodiments has similar functions and advantageous effects to those of the configuration of the above embodiments.

In the appearance inspection device of one or more embodiments, the plurality of objects may be conveyed in such a state that the plurality of objects are contained in containing recesses that are provided in the transparent conveyance body to be open to the first face side and to be expanded toward the second face side.

The configuration of one or more embodiments is unlikely to cause position displacement or the like of the objects and thereby enhances the inspection accuracy, compared with a configuration that performs inspection in such a state that the objects are not contained in containing recesses. In the configuration of one or more embodiments, at least the object side of the imaging optical system has the telecentric structure. This suppresses a positional change of the object in, for example, the pocket portion from affecting the magnification or the like.

When the object contained in the containing recess of the transparent conveyance body is to be imaged and inspected from the opening side of the containing recess (from the first face side), imaging may be performed in two different ways, depending on the position and the attitude of the object in the containing recess: imaging of the side face of the object across part of the transparent conveyance body, for example, a side wall portion of the containing recess or a general portion of the transparent conveyance body (non-forming portion of the containing recesses); and imaging of the side face of the object not across the transparent conveyance body but directly. As a result, this may fail to maintain the uniformity of inspection and may thus decrease the inspection accuracy.

The appearance inspection device of one or more embodiments is, on the other hand, configured to take an image of and inspect the objects across the containing recesses from at least the expanding side of the containing recesses (from the second face side). This configuration increases the uniformity of inspection and enhances the inspection accuracy.

In the appearance inspection device of one or more embodiments, a plurality of the imaging units may be placed around the inspection area on the first face side of the transparent conveyance body, in plan view that is viewed in a direction perpendicular to the first face.

In the appearance inspection device of one or more embodiments, the imaging units are placed on both the surface side and the rear face side of the transparent conveyance body. This configuration enables inspection of, for example, the side face of the object to be performed in an overlapping manner from the first face side as well as from the second face side of the transparent conveyance body. This configuration enhances the inspection accuracy.

When imaging and inspection are to be performed for the surface and the rear face of the object in addition to the side face of the object, this configuration allows for double-sided inspection without turning the surface and the rear face of the object upside down and thereby enhances the inspection efficiency.

In the appearance inspection device according to one or more embodiments, three or more imaging units may be placed around the inspection area on at least the second face side of the transparent conveyance body.

In the case where only two imaging units are placed around the inspection area, the imaging units are to be placed at an interval of 180 degrees with a view to uniformly imaging the whole circumference of the side face of the object at equal intervals. It is, however, difficult to adequately take an image at a location that is parallel to an optical axis of the imaging unit (imaging optical system) out of the whole circumference of the side face of the object and thereby to obtain appropriate image data.

Placing the three or more imaging units around the inspection area like the configuration of one or more embodiments, on the other hand, enables the imaging units to be placed at intervals of 120 degrees. This configuration is thus more likely to obtain the appropriate image data with regard to the whole circumference of the side face of the object. As a result, this enhances the inspection accuracy.

Using an excessive number of imaging units, however, increases overlaps of image data and is thus likely to increase the load involved in image processing. Accordingly, by taking into account the case of obtaining image data of the whole circumference of a side face of an object in a circular shape in plan view, in terms of the versatility, the number of the imaging units is not greater than eight that can be arranged, for example, at intervals of 45 degrees in one or more embodiments.

There is provided a blister packaging machine comprising the appearance inspection device according to one or more embodiments.

The blister packaging machine (for example, a PTP packaging machine) provided with the appearance inspection device like the configuration of one or more embodiments has an advantage of efficiently excluding defects in a manufacturing process of blister packages (for example, PTP sheets). The blister packaging machine may be configured to include a discharge unit that discharges the blister packages that are determined as defective by the appearance inspection device described above.

As a concrete example, the blister packaging machine may have a configuration described below.

There is provided a blister packaging machine (PTP packaging machine) configured to manufacture a blister package (PTP sheet) configured such that an object is contained in a pocket portion (containing recess) formed in a container film (transparent conveyance body) and that a cover film is mounted to the container film to close the pocket portion. The blister packaging machine comprises a pocket portion forming unit configured to form the pocket portion in the container film that is conveyed in a belt-like form; a filling unit configured to fill the object into the pocket portion; a mounting unit configured to mount the cover film to the container film with the object filled in the pocket portion, such as to close the pocket portion; a separation unit (including a punching unit to punch out a belt-like body in the unit of sheets) configured to separate the PTP sheet from a belt-like body (belt-like PTP film) formed by mounting the cover film to the container film; and the appearance inspection device according to one or more embodiments.

In the blister packaging machine of the above configuration, the above appearance inspection device may be placed "in a process after the process of filling the object into the pocket portion by the filling unit and before the process of mounting the cover film to the container film by the mounting unit". This configuration enables inspection of the object to be performed without any obstacle from a surface side of the container film (opening side of the pocket portion). This enhances the inspection accuracy.

According to a modification, the appearance inspection device described above may be configured "in a process after the process of mounting the cover film by the mounting unit and before the process of separating the blister package by the separation unit". This configuration performs inspection in the state that the objects are not exchanged and thereby enhances the inspection accuracy.

According to another configuration, the appearance inspection device described above may be placed "in a process after the process of separating the blister package by the separation unit". This configuration allows for checking for the presence of any defect in the final stage.

DETAILED DESCRIPTION

The following describes embodiments of the present invention with reference to drawings. The configuration of a PTP sheet serving as a blister package is described in detail first.

Figure 1A:
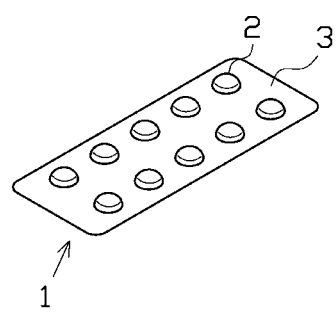
FIG. 1A is a perspective view illustrating a PTP sheet according to one or more embodiments.
Figure 1B:
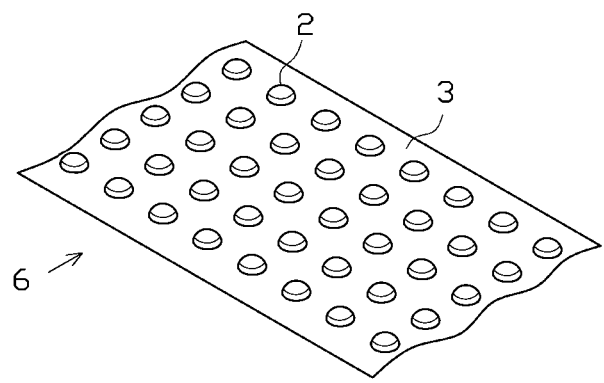
FIG. 1B is a perspective view illustrating a PTP film according to one or more embodiments.
Figure 2:
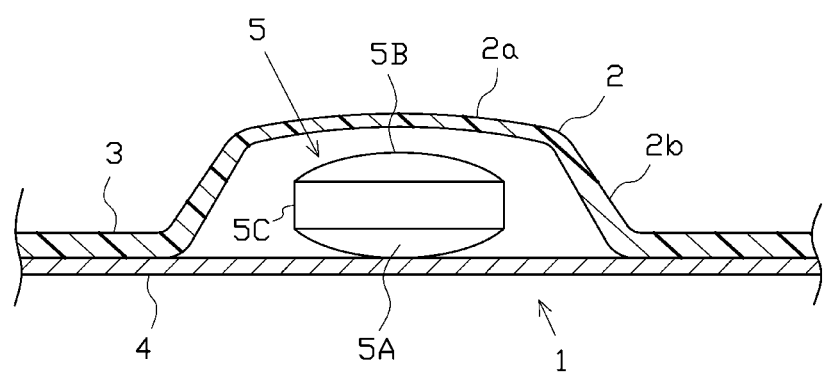
FIG. 2 is a partly enlarged sectional view illustrating a pocket portion of the PTP sheet according to one or more embodiments.

As shown in FIGS. 1 and 2, a PTP sheet 1 includes a container film 3 provided with a plurality of pocket portions 2, and a cover film 4 mounted to the container film 3 such as to close the respective pocket portions 2. The pocket portion 2 is configured as the containing recess according to one or more embodiments.

According to one or more embodiments, the container film 3 is made of a transparent thermoplastic resin material that is relatively hard and that has a predetermined rigidity, for example, PP (polypropylene) or PVC (polyvinyl chloride) and has optical transparency.

The cover film 4 is, on the other hand, made of an opaque material (for example, aluminum foil) with a sealant that is made of, for example, a polyester resin or the like and that is applied on a surface thereof.

The PTP sheet 1 is formed in an approximately rectangular shape in plan view. The PTP sheet 1 is configured such that two pocket arrays are formed along a sheet short side direction across a predetermined interval and that each pocket array includes five pocket portions 2 arranged along a sheet longitudinal direction at predetermined intervals. Accordingly, the PTP sheet 1 has a total of ten pocket portions 2.

One tablet 5 as an object is placed in each of the pocket portions 2. The tablet 5 according to one or more embodiments is an uncoated tablet that is in a circular shape in plan view and that has different thicknesses in a center region and in a peripheral region thereof (so-called lens-shaped tablet). Accordingly, the tablet 5 has outside faces including a surface 5A and a rear face 5B that are curved from respective center regions toward respective peripheral regions to be in a circular shape in plan view; and a side face 5C that is formed along the peripheral regions of both the surface 5A and the rear face 5B.

In the description of one or more embodiments, with regard to the container film 3 and the tablet 5, a face that faces upward and a face that faces downward during filling of the tablet 5 and during inspection (shown in FIG. 3) are respectively called "surface" and "rear face". The surface of the container film 3 corresponds to the first face, and the rear face of the container film 3 corresponds to the second face, according to one or more embodiments.

Furthermore, after mounting of the cover film 4, the tablet 5 is contained in the pocket portion 2 such that the surface 5A faces the cover film 4-side, the rear face 5B faces a bottom wall portion (top wall portion) 2a-side of the pocket portion 2, and the side face 5C faces a side wall portion 2b-side of the pocket portion 2.

The PTP sheet 1 (shown in FIG. 1A) is manufactured by punching sheets from a belt-like PTP film 6 (shown in FIG. 1B) that is formed from the belt-like container film 3 and the belt-like cover film 4.

Figure 3:
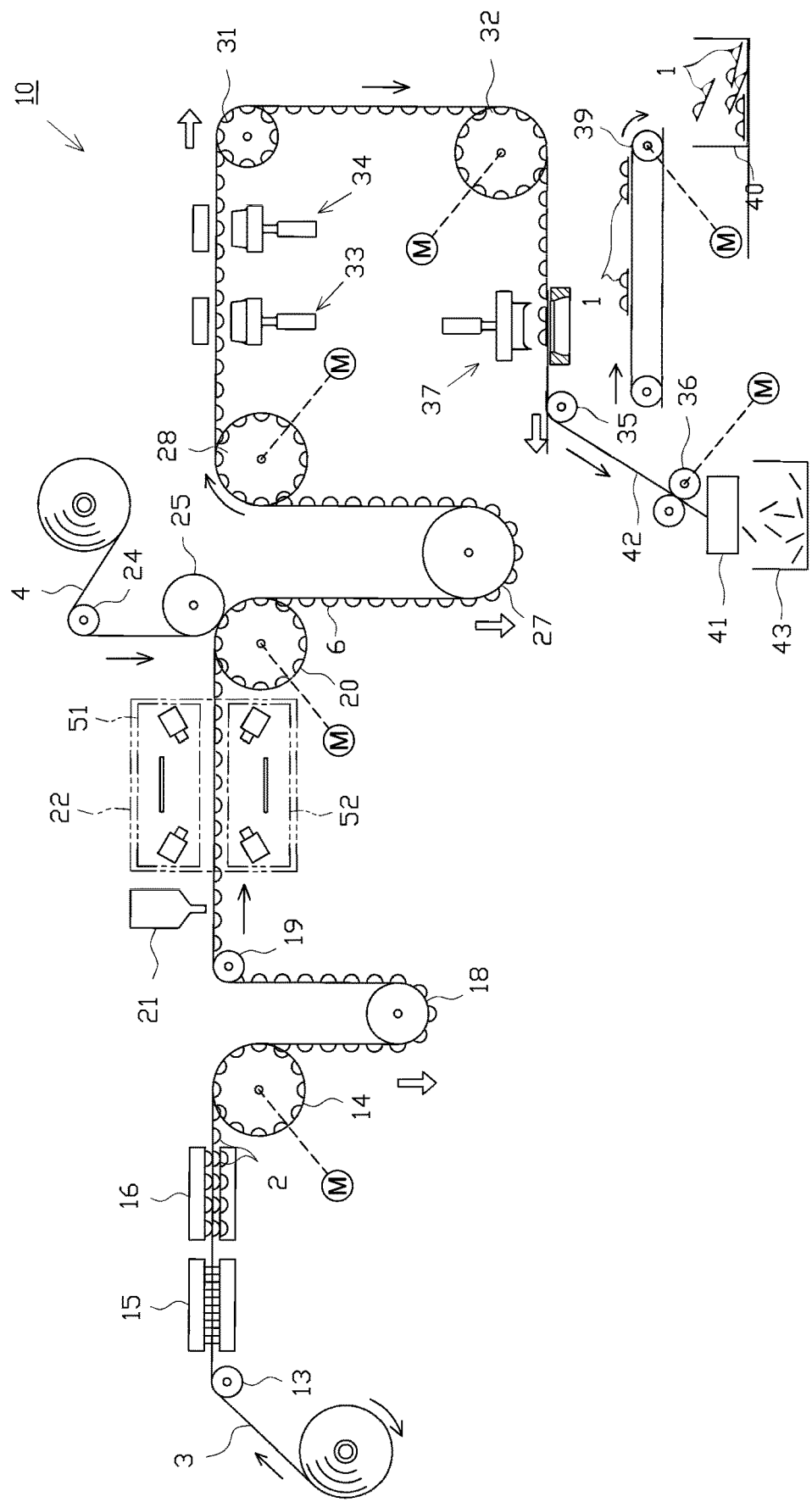
FIG. 3 is a schematic diagram illustrating the schematic configuration of a PTP packaging machine according to one or more embodiments.

The following describes the general configuration of a PTP packaging machine 10 serving as the blister packaging machine to manufacture the PTP sheet 1, with reference to FIG. 3.

As shown in FIG. 3, a film roll of the belt-like container film 3 is wound in a roll form on a most upstream side of the PTP packaging machine 10. The container film 3 is configured as the transparent conveyance body (conveyance body made of a transparent material) according to one or more embodiments.

A pullout end of the container film 3 wound in the roll form is guided by a guide roll 13. The container film 3 is then laid on an intermittent feed roll 14 placed on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, a plurality of pocket portions 2 are formed at predetermined positions of the container film 3 by the pocket portion forming device 16 (pocket portion forming process). The heating device 15 and the pocket portion forming device 16 are configured as the pocket portion forming unit according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed.

The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as the filling unit to automatically fill the tablets 5 into the pocket portions 2. The tablet filling device 21 opens a shutter at every predetermined time interval to drop the tablets 5, in synchronism with the conveying operation of the container film 3 by the film receiving roll 20. Each of the pocket portions 2 is filled with the tablet 5 by this shutter opening operation (filling process).

An appearance inspection device (tablet inspection device) 22 is placed along the conveyance path of the container film 3 between the tablet filling device 21 and the film receiving roll 20. The appearance inspection device 22 is configured to inspect the tablet 5 for any appearance abnormality of the tablet 5, for example, adhesion of any foreign substance or dirt or the presence of any break or crack. The details of the appearance inspection device 22 will be described later.

A film roll of the belt-like cover film 4 is also wound in a roll form on a most upstream side to be separately placed from the container film 3.

A pullout end of the cover film 4 wound in the roll form is guided by a guide roll 24 toward a heating roll 25. The heating roll 25 is pressed against to be in contact with the film receiving roll 20 described above. The container film 3 and the cover film 4 are fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations manufactures the PTP film 6 as the belt-like body with the tablets 5 filled in the respective pocket portions 2. Fine protrusions in a net-like pattern for sealing are formed on the surface of the heating roll 25. The tight press contact of this protruded surface of the heating roll 25 achieves tight sealing. The film receiving roll 20 and the heating roll 25 are configured as the mounting unit according to one or more embodiments.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit (not shown) at predetermined positions of the PTP film 6. The stamping device 34 serves to stamp a mark (not shown) at predetermined positions of the PTP film 6.

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as the sheet punching unit (separation unit) to punch out the outer periphery of each portion of the PTP film 6 in the unit of PTP sheet 1.

The respective PTP sheets 1 punched out by the sheet punching device 37 are conveyed by an extraction conveyor 39 and are temporarily accumulated in a finished product hopper 40 (separating process). When a PTP sheet 1 is determined as defective by the appearance inspection device 22 described above, the PTP sheet 1 determined as defective is separately discharged by a non-illustrated defective sheet discharge mechanism serving as the discharge unit.

A cutting device 41 is placed on a downstream side of the continuous feed roll 36. A non-required film portion 42 that forms a remaining material (scrap portion) and that remains in a belt-like form after punching out by the sheet punching device 37 is guided by the tension roll 35 and the continuous feed roll 36 described above and is subsequently led to the cutting device 41. A driven roll is pressed against to be in contact with the continuous feed roll 36, so that the non-required film portion 42 is placed and conveyed between the driven roll and the continuous feed roll 36. The cutting device 41 serves to cut the non-required film portion 42 into predetermined dimensions as scraps. These scraps are accumulated in a scrap hopper 43 and are subsequently disposed separately.

Each of the rolls 14, 20, 28, 31, 32 and the like described above is arranged such that the roll surface is opposed to the pocket portions 2. The surface of the intermittent feed roll 14 or the like has recesses that are formed to place the pocket portions 2 therein. This configuration suppresses the pocket portions 2 from being crushed. The feeding operation with the pocket portions 2 placed in the respective recesses of the intermittent feed roll 14 or the like achieves the reliable intermittent feed and continuous feed.

Figure 4:
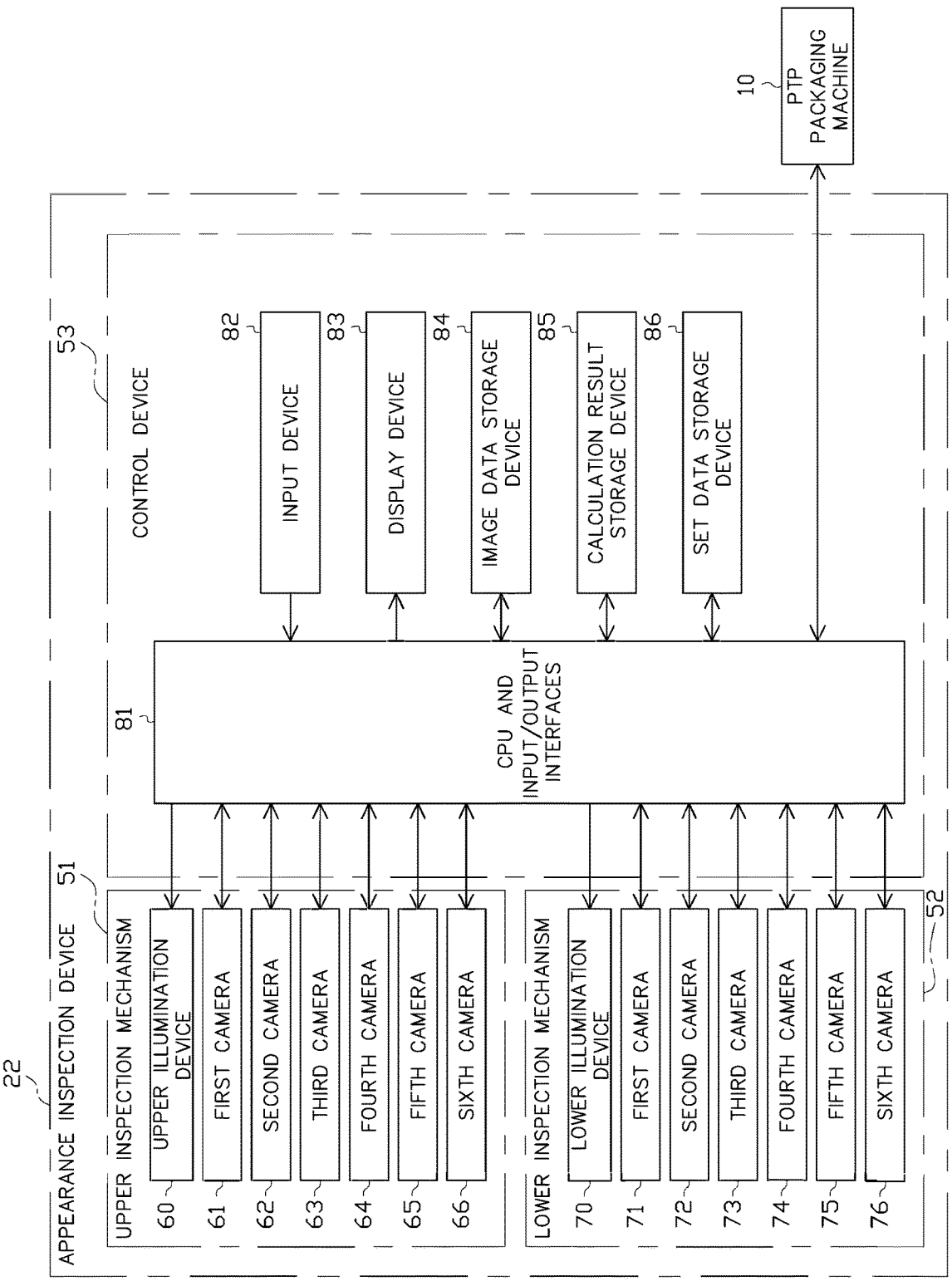
FIG. 4 is a block diagram illustrating the electrical configuration of an appearance inspection device according to one or more embodiments.
Figure 5:
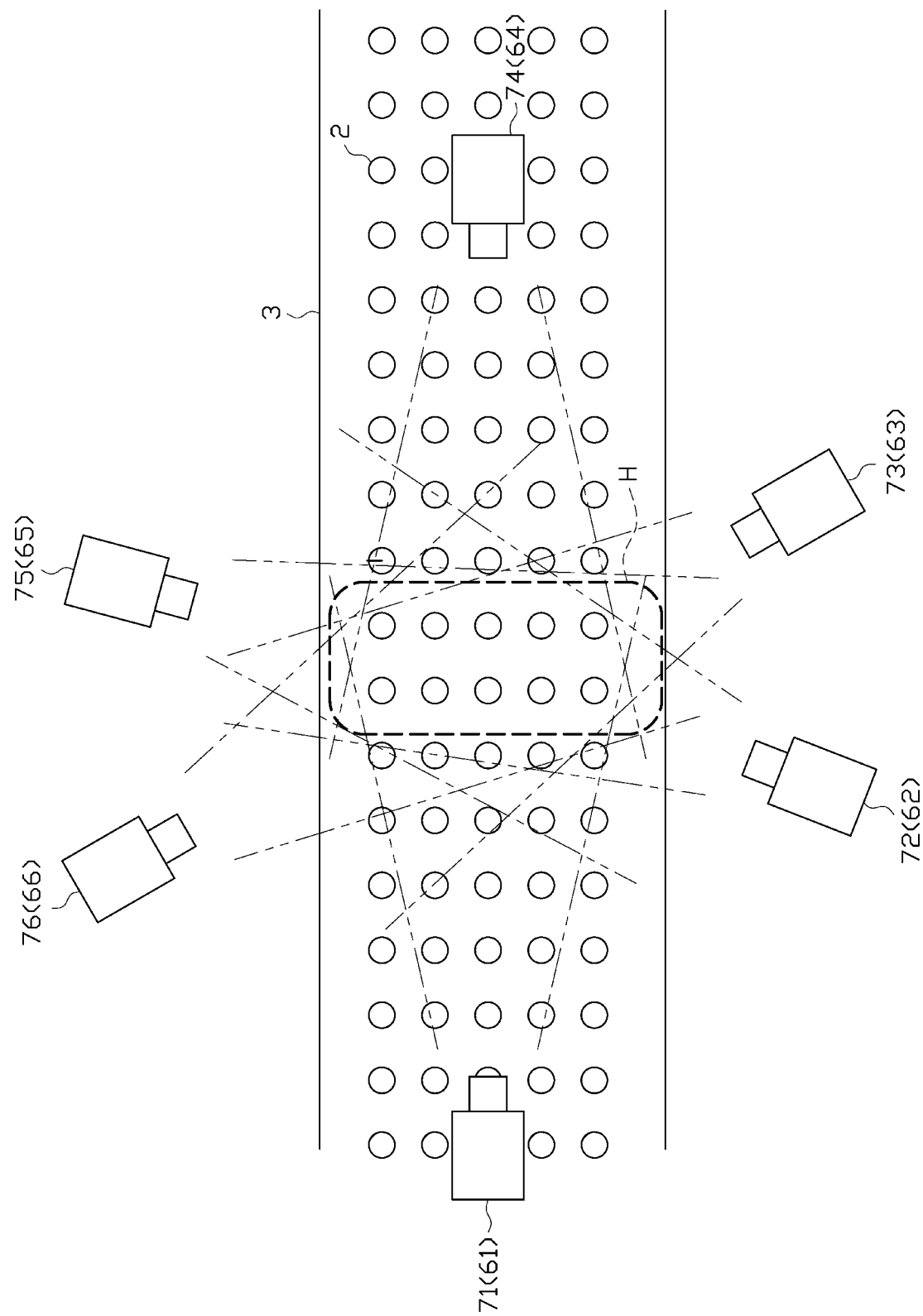
FIG. 5 is a schematic bottom view illustrating the schematic configuration of the appearance inspection device according to one or more embodiments.
Figure 6:
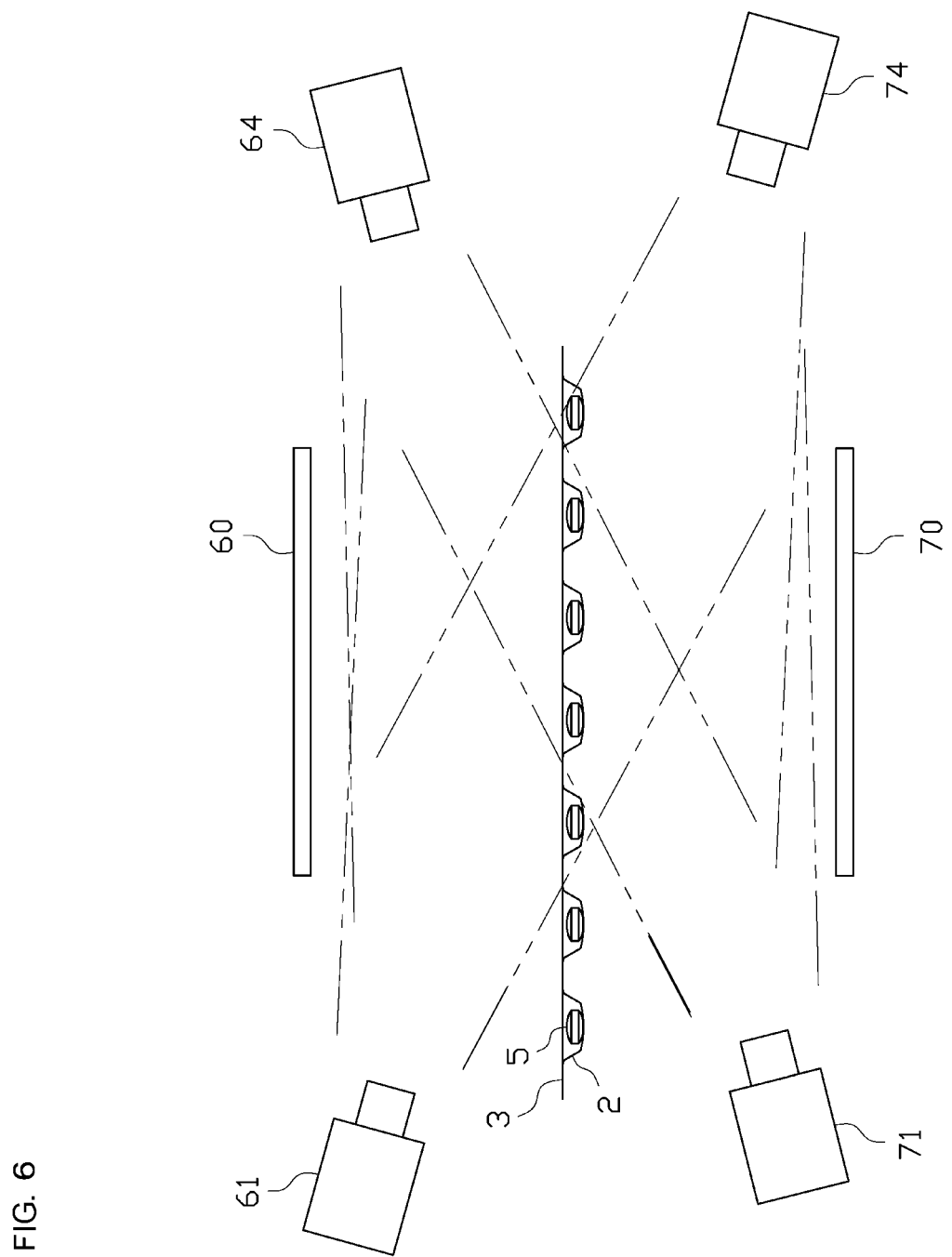
FIG. 6 is a schematic side view illustrating the schematic configuration of the appearance inspection device according to one or more embodiments.

The foregoing describes the outline of the PTP packaging machine 10. The following describes the configuration of the appearance inspection device 22 in detail with reference to drawings. FIG. 4 is a block diagram illustrating the electrical configuration of the appearance inspection device 22. FIG. 5 is a schematic bottom view illustrating the schematic configuration of the appearance inspection device 22. FIG. 6 is a schematic side view illustrating the schematic configuration of the appearance inspection device 22.

The appearance inspection device 22 includes an upper inspection mechanism 51 configured to perform appearance inspection of the tablets 5 from above the container film 3 that is conveyed horizontally (mainly the vicinity of the peripheral region of the surface 5A according to one or more embodiments); a lower inspection mechanism 52 configured to perform appearance inspection of the tablets 5 from below the container film 3 (mainly the vicinity of the peripheral region of the rear face 5B and the side face 5C according to one or more embodiments); and a control device 53 configured to perform various controls, image processing, arithmetic operations and the like in the appearance inspection device 22, for example, drive control of both the inspection mechanisms 51 and 52. The control device 53 is configured as the image processing unit according to one or more embodiments.

The upper inspection mechanism 51 is placed at a position above the conveyance path of the container film 3 or more specifically, on the surface side of the container film 3 (on the opening side of the pocket portion 2). The upper inspection mechanism 51 includes an upper illumination device 60 serving as the irradiation unit and six cameras (first camera 61 to sixth camera 66) serving as the imaging unit.

According to one or more embodiments, a ring-shaped light in an approximately circular shape configured to emit infrared light is used as the upper illumination device 60. The upper illumination device 60 is placed to irradiate ten tablets 5 on the container film 3 located in a predetermined inspection area H (shown in FIG. 5) that is set in advance, obliquely downward with infrared light. Accordingly, the surface 5A and the whole circumference of the side face 5C of each of the tablets 5 are irradiated with the infrared light. The inspection area H according to one or more embodiments is set corresponding to one PTP sheet 1 as a product and has approximately the same shape as the shape of this PTP sheet 1.

Even when the tablet 5 has a stamp portion or the like unlike the tablet 5 of one or more embodiments, radiation of infrared light takes no account of the stamp portion. Accordingly, this configuration enables a foreign substance or the like that is present in a region of the stamp portion, if any, to be detected and thereby improves the inspection accuracy. Additionally, using the infrared light enables an image that has the higher luminance of the tablet 5 itself than the luminance of the foreign substance or the like, to be obtained, irrespective of the color of the tablet 5.

The six cameras 61 to 66 are arranged in a circular pattern to surround the inspection area H in plan view that is viewed in a vertical direction perpendicular to both the surface and the rear face of the container film 3.

More specifically, the six cameras 61 to 66 are arranged around the inspection area H (a predetermined point in the inspection area H) in a circumferential direction of the inspection area H (in a counterclockwise direction on FIG. 5), such that the second camera 62 is placed at an interval of approximately 70 degrees from the first camera 61 located on a most upstream side in a film conveying direction, the third camera 63 is placed at an interval of approximately 40 degrees from the second camera 62, the fourth camera 64 is placed at an interval of approximately 70 degrees from the third camera 63, the fifth camera 65 is placed at an interval of approximately 70 degrees from the fourth camera 64, the sixth camera 66 is placed at an interval of approximately 40 degrees from the fifth camera 65, and the first camera 61 is placed at an interval of approximately 70 degrees from the sixth camera 66.

In other words, the first camera 61 and the fourth camera 64 are almost opposed to each other, the second camera 62 and the fifth camera 65 are almost opposed to each other, and the third camera 63 and the sixth camera 66 are almost opposed to each other in plan view.

The first camera 61 is placed at a position above the container film 3 on an upstream side of the inspection area H in the film conveying direction, and the fourth camera 64 is placed at a position above the container film 3 on a downstream side of the inspection area H in the film conveying direction. The second camera 62, the third camera 63, the fifth camera 65 and the sixth camera 66 are, on the other hand, respectively placed at positions deviated laterally from above the conveyance path of the container film 3 in plan view.

The inspection area H described above is set at a position where imaging visual fields of these six cameras 61 to 66 overlap one another.

The lower inspection mechanism 52 is placed at a position below the conveyance path of the container film 3 or more specifically, on the rear face side of the container film 3 (on the protrusion side of the pocket portion 2). The lower inspection mechanism 52 includes a lower illumination device 70 serving as the irradiation unit and six cameras (first camera 71 to sixth camera 76) serving as the imaging unit.

According to one or more embodiments, a ring-shaped light in an approximately circular shape configured to emit infrared light is used as the lower illumination device 70. The lower illumination device 70 is placed to irradiate ten tablets 5 on the container film 3 located in the inspection area H obliquely upward across the pocket portions 2 with infrared light. Accordingly, the rear face 5B and the whole circumference of the side face 5C of each of the tablets 5 are irradiated with the infrared light.

The six cameras 71 to 76 are arranged in a circular pattern to surround the inspection area H in bottom view that is viewed in the vertical direction perpendicular to both the surface and the rear face of the container film 3.

More specifically, the six cameras 71 to 76 are arranged around the inspection area H (the predetermined point in the inspection area H) in the circumferential direction of the inspection area H (in the counterclockwise direction on FIG. 5), such that the second camera 72 is placed at an interval of approximately 70 degrees from the first camera 71 located on the most upstream side in the film conveying direction, the third camera 73 is placed at an interval of approximately 40 degrees from the second camera 72, the fourth camera 74 is placed at an interval of approximately 70 degrees from the third camera 73, the fifth camera 75 is placed at an interval of approximately 70 degrees from the fourth camera 74, the sixth camera 76 is placed at an interval of approximately 40 degrees from the fifth camera 75, and the first camera 71 is placed at an interval of approximately 70 degrees from the sixth camera 76.

In other words, the first camera 71 and the fourth camera 74 are almost opposed to each other, the second camera 72 and the fifth camera 75 are almost opposed to each other, and the third camera 73 and the sixth camera 76 are almost opposed to each other in bottom view.

The first camera 71 is placed at a position below the container film 3 on the upstream side of the inspection area H in the film conveying direction, and the fourth camera 74 is placed at a position below the container film 3 on the downstream side of the inspection area H in the film conveying direction. The second camera 72, the third camera 73, the fifth camera 75 and the sixth camera 76 are, on the other hand, respectively placed at positions deviated laterally from above the conveyance path of the container film 3 in bottom view.

The inspection area H described above is set at a position where imaging visual fields of these six cameras 71 to 76 overlap one another.

Figure 7:
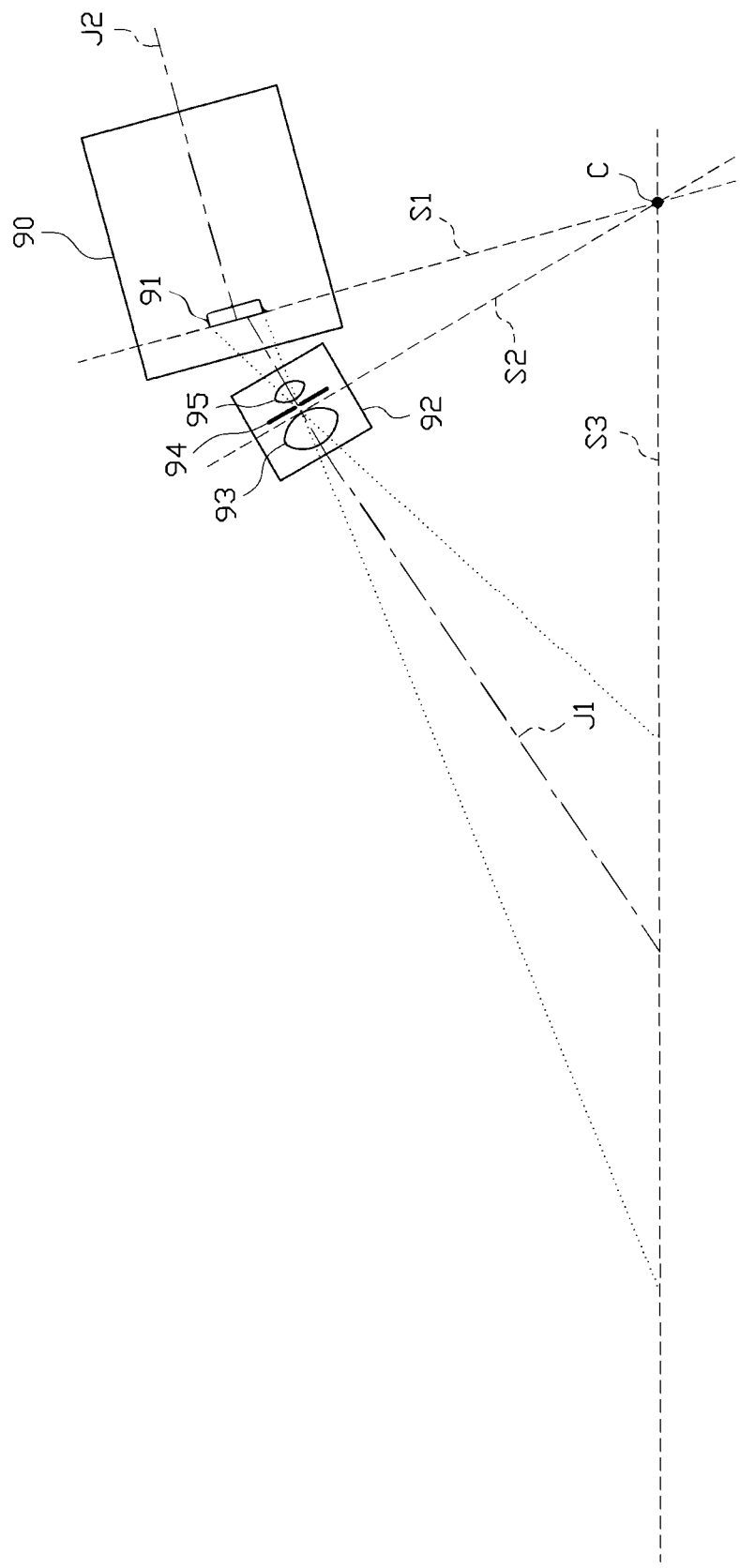
FIG. 7 is a schematic diagram illustrating the schematic configuration of a camera and the Scheimpflug principle according to one or more embodiments.

The following describes the configuration of the cameras 61 to 66 of the upper inspection mechanism 51 and the cameras 71 to 76 of the lower inspection mechanism 52 in detail with reference to FIG. 7. The cameras 61 to 66 and 71 to 76 have identical configurations. Accordingly, in the description below, the cameras 61 to 66 and 71 to 76 may be referred to as the "camera 61 or the like" in the case where there is no need to distinguish the respective cameras 61 to 66 and 71 to 76 from one another.

The camera 61 or the like includes a housing 90 that forms a main body unit thereof, an imaging element 91 that is placed in the housing 90 and that has a light receiving face with a plurality of light receiving elements arranged two-dimensionally, and a lens unit 92 that serves as the imaging optical system to form an image of the tablets 5 located in the inspection area H, onto the imaging element 91.

According to one or more embodiments, the imaging element 91 employed is a CCD area sensor having sufficient sensitivity to infrared light.

The lens unit 92 is configured by both-side telecentric lenses (both-side telecentric optical system) that integrally include, for example, an object-side lens 93, an aperture diaphragm 94 and an imaging-side lens 95.

The object-side lens 93 is configured to collect the reflected light from the tablets 5 located in the inspection area H and has a telecentric structure where an optical axis J1 thereof is made parallel to the principal ray on the object side.

The imaging-side lens 95 is configured to focus the light transmitted from the object-side lens 93 through the aperture diaphragm 94 and form an image onto the light receiving face of the imaging element 91 and has a telecentric structure where the optical axis J1 is made parallel to the principal ray on the image side.

The aperture diaphragm 94 is located at a position of a rear focal point of the object-side lens 93 and at a position of a front focal point of the imaging-side lens 95.

The camera 61 or the like also has an angle adjustment mechanism (tilt mechanism) configured to regulate the angle of the optical axis J1 of the lens unit 92 relative to a principal axis J2 of the housing 90 (an axis perpendicular to the light receiving face of the imaging element 91). The angle adjustment mechanism is the known art, so that its detailed description with reference to drawings is omitted.

According to one or more embodiments, the inclinations of the housing 90 (imaging element 91) and the lens unit 92 of the camera 61 or the like having the configuration described above are adjusted, such that all the ten tablets 5 on the container film 3 located in the inspection area H are placed in an in-focus range (depth of field).

More specifically, the light receiving face of the imaging element 91 and a principal plane of the lens unit 92 are set to satisfy the Scheimpflug condition relative to the ten tablet 5 on the container film 3 located in the inspection area H.

The Scheimpflug principle is described with reference to FIG. 7. The Scheimpflug principle is as follows: when a plane S1 including the light receiving face of the imaging element 91 and a plane S2 including the principal plane of the lens unit 92 cross each other on an identical straight line C (straight line perpendicular to the sheet surface at a point C on FIG. 7), an object plane in the in-focus state (object plane which the camera 61 or the like is focused on) S3 also crosses on the identical straight line C. Accordingly, the condition based on this Scheimpflug principle is that the plane S1 including the light receiving face of the imaging element 91, the plane S2 including the principal plane of the lens unit 92 and the plane (imaged surface) S3 including the ten tablets 5 located in the inspection area H cross one another on the identical straight line C. This configuration ensures in-focus imaging of a wide range in the inspection area H.

According to one or more embodiments, the optical axis J1 of the lens unit 91 is set in advance to be inclined to the container film 3 by about 30 degrees. The set angle is, however, not limited to this value but may be any appropriate angle according to the relation to the inspection area H.

Image data obtained by the camera 61 or the like having the configuration described above is converted into a digital signal in the camera 61 or the like, is input in the form of the digital signal into the control device 53 and is stored in an image data storage device 84 described below. The control device 53 performs image processing, arithmetic operations and the like described below, based on the image data.

The following describes the electrical configuration of the control device 53 with reference to FIG. 4. The control device 53 includes a CPU and input/output interfaces 81 (hereinafter referred to as the "CPU and the like 81") that is configured to control the entire appearance inspection device 22; an input device 82 that is configured as the "input unit" by, for example, a keyboard and a mouse or by a touch panel; a display device 83 that is configured as the "display unit" including a display screen such as a CRT screen or a liquid crystal screen, an image data storage device 84 that is configured to store various image data and the like; a calculation result storage device 85 that is configured to store results of various arithmetic operations and the like; and a set data storage device 86 that is configured to store various pieces of information in advance. These devices 82 to 86 are electrically connected with the CPU and the like 81.

The CPU and the like 81 is configured to control the entire control device 53 and is connected with the PTP packaging machine 10 such as to send and receive various signals to and from the PTP packaging machine 10. This configuration enables the CPU and the like 81 to control, for example, the defective sheet discharge mechanism of the PTP packaging machine 10.

The image data storage device 84 is configured to store, for example, luminance image data taken by the camera 61 or the like and binarized image data obtained after a binarization process of the luminance image data.

The calculation result storage device 85 is configured to store, for example, data such as coordinates with regard to various image data, inspection result data of the tablets 5 and statistical data obtained by statistically processing the inspection result data. These inspection result data and statistical data may be displayed appropriately on the display device 83.

The set data storage device 86 is configured to store, for example, a reference value involved in the binarization process, a criterion value involved in quality judgment, as well as the shapes and the dimensions of the PTP sheet 1, the pocket portion 2 and the tablet 5. These data may be set by the input device 82.

Figure 8:
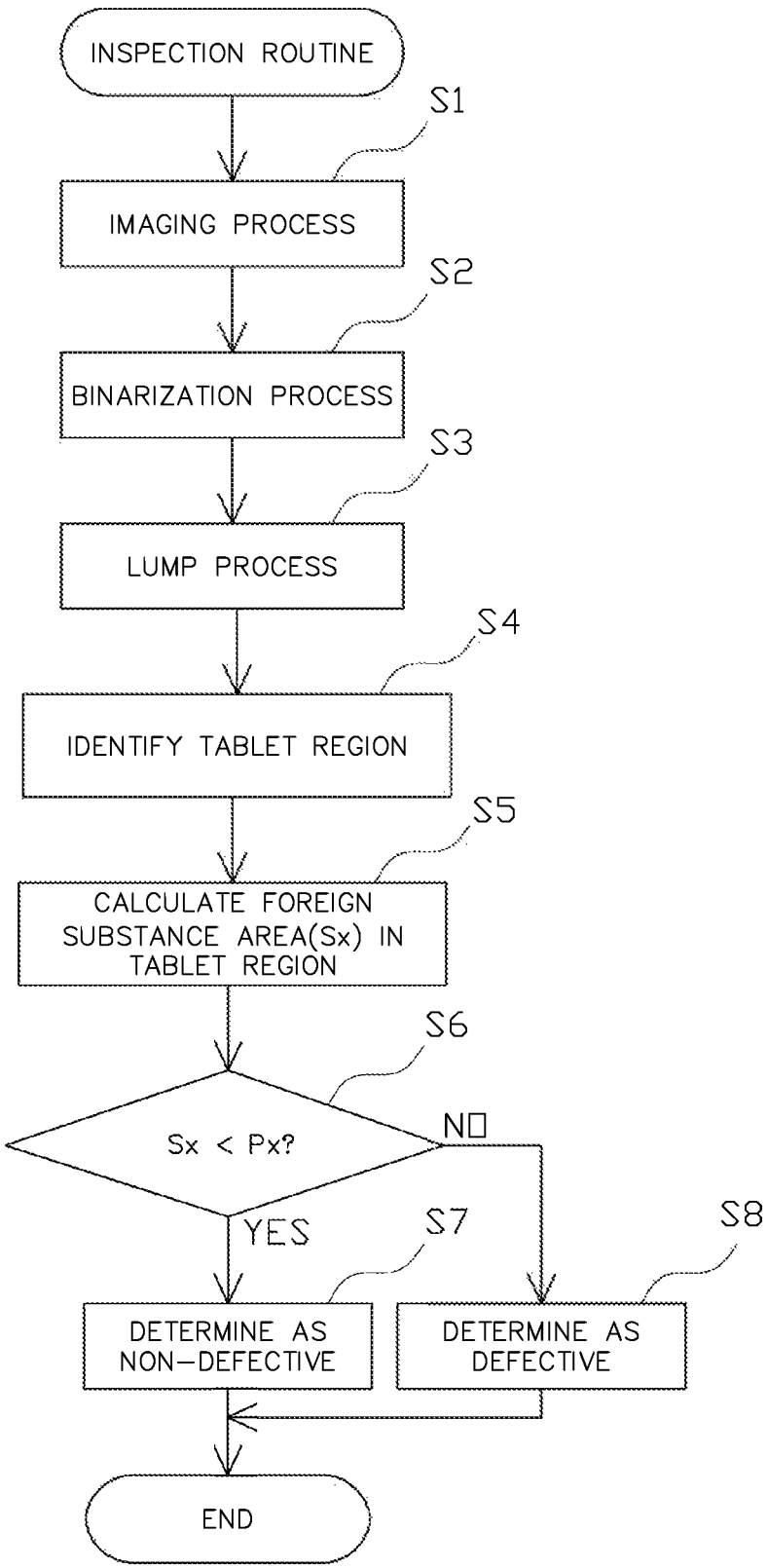
FIG. 8 is a flowchart showing an inspection routine according to one or more embodiments.

The following describes an inspection procedure of the tablets 5 by the appearance inspection device 22 with reference to the flowchart of FIG. 8. An inspection routine shown in FIG. 8 is a process performed repeatedly by the control device 53 every time the container film 3 is conveyed by a predetermined amount.

The inspection routine shown in FIG. 8 is performed with regard to each image data obtained by the individual camera 61 or the like. According to one or more embodiments, the six cameras 61 to 66 of the upper inspection mechanism 51 and the six cameras 71 to 76 of the lower inspection mechanism 52 respectively take images at the same time with regard to a range of the container film 3 corresponding to a predetermined PTP sheet 1, and a total of twelve image data are obtained simultaneously. Accordingly, the inspection routine is performed in parallel with regard to these twelve image data. The inspection routine shown in FIG. 8 is described in detail below.

At step S1, the control device 53 first performs an imaging process at a predetermined timing. More specifically, when the container film 3 is conveyed by a predetermined amount in response to a signal from a non-illustrated encoder provided in the PTP packaging machine 10 and it is determined that the range of the container film 3 corresponding to the predetermined PTP sheet 1 reaches the inspection area H, the control device 53 controls the upper and the lower inspection mechanisms 51 and 52 to take images of the ten tablets 5 located in the inspection area H.

Figure 9:
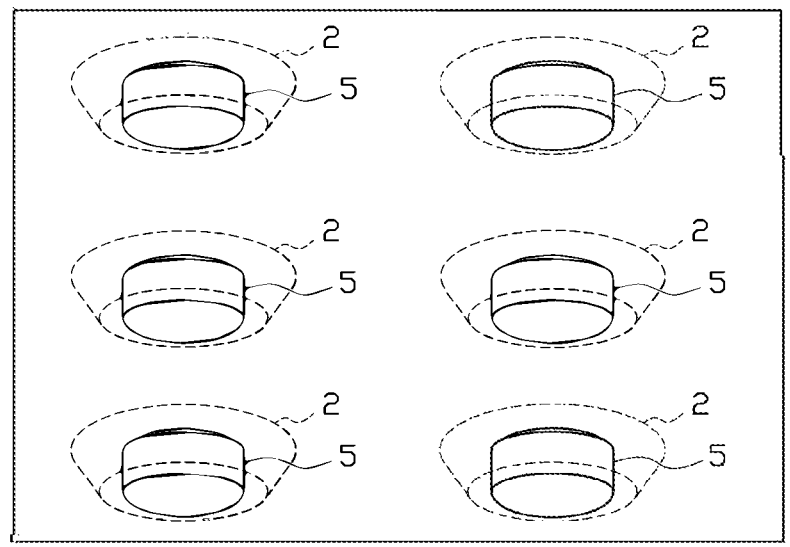
FIG. 9 is a diagram illustrating part of images obtained by cameras of a lower inspection mechanism according to one or more embodiments.
Figure 10:
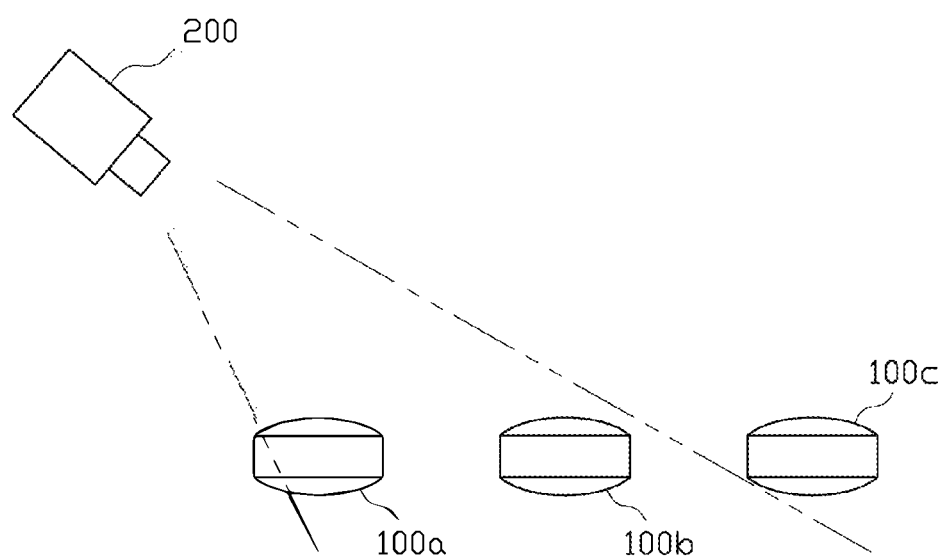
FIG. 10 is a schematic diagram illustrating the schematic configuration of a prior art camera and others.
Figure 11:
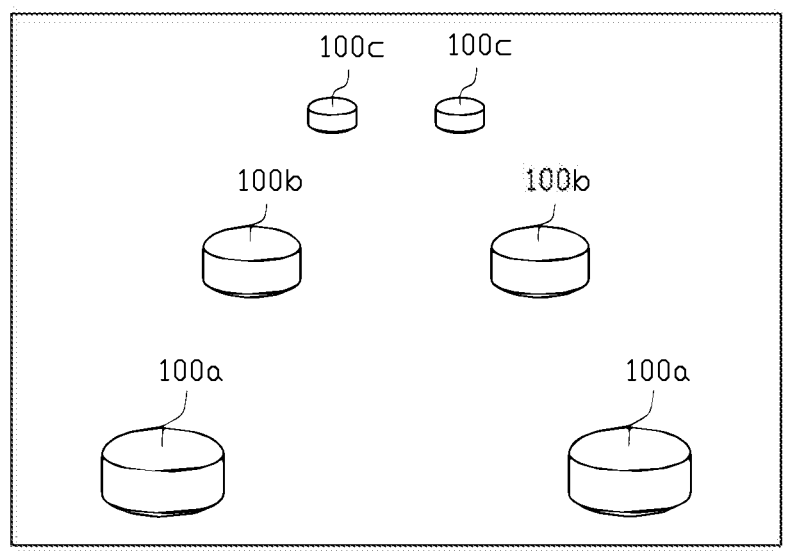
FIG. 11 is a diagram illustrating part of images obtained by the prior art camera.

Accordingly, luminance image data respectively including parts of the surfaces 5A and the side faces 5C of the ten tablets 5 are obtained by the six cameras 61 to 66 of the upper inspection mechanism 51, while luminance image data respectively including parts of the rear faces 5B and the side faces 5 of the ten tablets 5 are obtained by the six cameras 71 to 76 of the lower inspection mechanism 52 (as shown in FIG. 9). These luminance image data are respectively stored into the image data storage device 84.

After obtaining these luminance image data, the control device 53 performs a binarization process at step S2. More specifically, the control device 53 binarizes the respective luminance image data stored in the image data storage device 84 by using a predetermined reference value to generate binarized image data. These binarized image data are also respectively stored into the image data storage device 84.

A concrete procedure converts each luminance image data into binarized image data by setting each part having a luminosity value that is equal to or higher than the reference value as "1 (light)" and each part having a luminosity value that is lower than the reference value as "0 (dark)". In each binarized image data, a part having any foreign substance, any break or the like is shown as "0 (dark), and a range where the tablet 5 or the like is present is shown as "1 (light)".

At subsequent step S3, the control device 53 performs a lump process with regard to each of the binarized image data stored in the image data storage device 84. This lump process identifies each linkage component based on the values "0 (dark)" and "1 (light)" of each of the binarized image data and labels each linkage component.

At step S4, the control device 53 identifies a linkage component corresponding to the tablet 5 as a tablet region, out of the linkage components of the value "1 (light)" calculated from each of the binarized image data. The linkage component corresponding to the tablet 5 may be identified by specifying, for example, a linkage component including predetermined coordinates, a linkage component having a predetermined shape or a linkage component having a predetermined area.

At subsequent step S5, the control device 53 calculates a foreign substance area Sx in the tablet region, based on the tablet region identified at step S4. More specifically, the control device 53 extracts an area that is included in the coordinates of the tablet region identified at step S4 or that is continuous with the tablet region, out of the linkage components of the value "0 (dark)" calculated from each of the binarized image data, and specifies the extracted area as the foreign substance area Sx.

At step S6, the control device 53 determines whether each foreign substance area Sx calculated at step S5 is smaller than a predetermined criterion value Px.

When all the foreign substance areas Sx in each binarized image data are smaller than the criterion value Px, the control device 53 determines the tablet 5 as non-defective at step S7, stores this result into the calculation result storage device 85, and then terminates this process.

When any of the foreign substance areas Sx is larger than the criterion value Px, on the other hand, the control device 53 determines the tablet 5 as defective at step S8, stores this result into the calculation result storage device 85, and then terminates this process.

When there is no inspection result determined as defective among the inspection results of all the image data (all the image data obtained by the cameras 61 to 66 and the cameras 71 to 76) corresponding to the predetermined PTP sheet 1, based on the inspection results of the respective image data stored in the calculation result storage device 85, the control device 53 determines the PTP sheet 1 as non-defective.

When there is any inspection result determined as defective among the inspection results of all the image data, on the other hand, the control device 53 determines the PTP sheet 1 as defective and outputs this inspection result to the display device 83 and the PTP packaging device 10 (including the defective sheet discharge mechanism).

As described above in detail, the configuration of one or more embodiments simultaneously performs the appearance inspection for the whole circumferences of the side faces 5C of the ten tablets 5 included in the predetermined PTP sheet 1 and the appearance inspection for the surfaces 5A and the rear faces 5B of the tablets 5. This configuration enhances the inspection efficiency.

Additionally, the configuration of one or more embodiments sets the light receiving face of the imaging element 91 and the principal plane of the lens unit 92 to satisfy the Scheimpflug condition relative to the ten tablets 5 on the container film 3 located in the inspection area H. This configuration enables the image data of an in-focus image of all the ten tablets 5 located in the inspection area H to be obtained. As a result, this configuration increases the uniformity of inspection and enhances the inspection accuracy.

Furthermore, according to one or more embodiments, the lens unit 92 serving as the imaging optical system is configured by the both-side telecentric lenses (both-side telecentric optical system). This configuration causes the sizes of the images of the ten tablets 5 formed on the imaging element 91 (the sizes of the ten tablets 5 on the image data) to be substantially the same, irrespective of the distances between the imaging element 91 and the ten tablets 5. This configuration uniformizes the resolution among the ten tablets 5 or among the plurality of image data with regard to one tablet 5. As a result, this increases the uniformity of inspection and enhances the inspection accuracy.

The configuration of one or more embodiments takes images of and inspects the ten tablets 5 located in the inspection area H by using the six cameras (first camera 61 to sixth camera 66) of the upper inspection mechanism 51 and the six cameras (first camera 71 to sixth camera 76) of the lower inspection mechanism 52. This configuration enables the appropriate image data with regard to the whole circumferences of the side faces 5C of the tablets 5 to be obtained more reliably. As a result, this enhances the inspection accuracy.

The present invention is not limited to the description of the above embodiments but may be implemented, for example, by configurations described below. The present invention may also be naturally implemented by applications and modifications other than those illustrated below.

(a) The above embodiments describe the uncoated tablet having different thicknesses in the center region and in the peripheral region, i.e., the so-called lens-shaped tablet, as an example of the tablet 5 that is the object. The type of the tablet is, however, not limited to the above embodiments. For example, the tablet may be a flat tablet in a disc shape having a chamfered portion in a peripheral region, a triangular or a rectangular tablet that is not circular in plan view, a capsule or a soft capsule.

The object is not limited to the tablet (medicine) but may be a supplement, a food item, an electronic component, an electronic device or a medical device.

(b) The materials of the container film 3 and the cover film 4 are not limited to those described in the above embodiments, but other materials may be employed for the container film 3 and the cover film 4. In one or more embodiments, the container film 3 is formed from a transparent material with a view to allowing for inspection of the tablets 5 across the container film 3.

(c) The configuration of the PTP sheet 1 (for example, the shape, the arrangement and the number of the pocket portions 2) is not limited to that of the embodiments described above, but another configuration may be employed. For example, a PTP sheet may be configured to have three arrays of and a total of twelve pocket portions or may be configured to have pocket portions of any arrangement and any number. The PTP sheet is not essential but may be replaced with another blister package, such as a blister pack.

(d) The configuration of the appearance inspection device 22 is not limited to that of the embodiments described above, but another configuration may be employed.

For example, the appearance inspection device 22 according to the embodiments described above is configured to include the upper inspection mechanism 51 that performs appearance inspection of the tablets 5 from above the container film 3 and the lower inspection mechanism 52 that performs appearance inspection of the tablets 5 from below the container film 3. This configuration is, however, not essential. When only inspection of the side faces 5C of the tablets 5 is required, a modified configuration may include only the lower inspection mechanism 52 with omission of the upper inspection mechanism 51.

According to the embodiments described above, the upper and the lower inspection mechanisms 51 and 52 are configured to respectively include the six cameras 61 to 66 and the six cameras 71 to 76. The number of the cameras is not limited to the above embodiments. For the appropriate appearance inspection, the upper and the lower inspection mechanisms 51 and 52 respectively include three or more cameras and also include eight or less cameras in one or more embodiments.

The arrangement of the cameras is not limited to that of the embodiments described above. For example, the six cameras 61 to 66 and the six cameras 71 to 76 may be respectively arranged at equal intervals of 60 degrees in the upper inspection mechanism 51 and in the lower inspection mechanism 52.

(e) The configuration of the irradiation unit is not limited to that of the embodiments described above. For example, according to the embodiments described above, the ring-shaped light configured to emit infrared light is employed as the illumination devices 60 and 70. This is, however, not essential, but each of the illumination devices 60 and 70 may be configured to emit visible light.

(f) The configuration of the imaging unit is not limited to that of the embodiments described above. For example, according to the embodiments described above, the CCD area sensor is employed as the imaging element 91. The imaging element 91 is, however, not limited to the above embodiments, but, for example, a CMOS area sensor may be employed as the imaging element 91.

According to the embodiments described above, the lens unit 92 that is the both-side telecentric lenses (both-side telecentric optical system) is employed as the imaging optical system. This is, however, not essential, and an object-side telecentric optical system may be employed as the imaging optical system.

The embodiments described above is configured to have the function of adjusting the inclination of the lens unit 92. A modification may be configured to have a function of adjusting the inclination of the imaging element 91, in place of or in addition to the function of adjusting the inclination of the lens unit 92.

(g) The inspection procedure of the tablets 5 is not limited to that of the embodiments described above, but another procedure may be employed. For example, the above embodiments are configured to perform quality judgment of the tablets 5 with regard to each of the image data respectively obtained by the cameras 61 to 66 and the cameras 71 to 76. This configuration is, however, not essential. For example, a modification may be configured to extract data corresponding to one tablet 5 from each of a plurality of image data, to generate linked image data corresponding to the whole circumference of the side face 5C of the tablet 5, based on the extracted data, and to perform quality judgment of the tablets 5, based on the linked image data.

(h) According to the embodiments described above, the appearance inspection device 22 is configured to perform appearance inspection of the tablets 5 in a process after the process of filling the pocket portions 2 with the tablets 5 and before the process of mounting the cover film 4 to the container film 3.

This configuration is, however, not essential. For example, according to a modification, the appearance inspection device 22 may be configured to perform appearance inspection of the tablets 5 from the container film 3-side of the PTP film 6 in a process after the process of mounting the cover film 4 to the container film 3 and before the process of punching out the PTP sheet 1 from the PTP film 6.

According to another modification, the appearance inspection device 22 may be configured to perform appearance inspection of the tablets 5 from the container film 3-side of the PTP sheet 1 that is conveyed by the extraction conveyor 39 in a process after the process of punching out the PTP sheet 1 from the PTP film 6.

According to another modification, the appearance inspection device 22 may be configured to perform appearance inspection of the tablets 5 not during continuous conveyance but during stop of conveyance in the course of intermittently conveying the container film 3.

(i) The embodiments described above employ the configuration that the appearance inspection device 22 is provided in the PTP packaging machine 10 (inline configuration). This configuration may be replaced by a modified configuration that the appearance inspection device 22 is provided separately from the PTP packaging machine 10 to perform offline appearance inspection of the tablets 5.

In this modification, the appearance inspection device 22 may be provided with a transparent conveyance body configured to convey the tablets 5. For example, the appearance inspection device 22 may be provided with a mechanism of conveying a plurality of tablets 5 arrayed on a transparent glass plate and may perform side face inspection of the tablets 5 from below the transparent glass plate.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 5A . . . surface, 5B . . . rear face, 5C . . . side face, 10 . . . PTP packaging machine, 22 . . . appearance inspection device, 51 . . . upper inspection mechanism, 52 . . . lower inspection mechanism, 53 . . . control device, 60 . . . upper illumination device, 61-66 . . .

cameras, 70 . . . lower illumination device, 71-76 . . . cameras, 91 . . . imaging element, 92 . . . lens unit, H . . . inspection area

The invention claimed is:

1. An appearance inspection device comprising:
a container film having a first face and a second face and conveyed in a predetermined direction, wherein a plurality of tablets are arranged at predetermined intervals on the first face;
an illumination device that irradiates with predetermined light an inspection area in which the tablets conveyed by the container film are inspected;
a plurality of imaging devices each of which takes, along a predetermined direction, an image of part of side faces of the tablets located in the inspection area, wherein the predetermined direction is inclined to both the first and second faces; and
a processor that inspects an appearance of the side faces of the tablets based on image data obtained by the imaging device, wherein
the imaging devices are placed around the inspection area on the second face, in plan view viewed in a direction perpendicular to the second face, and
each of the imaging devices comprises:
an imaging element that comprises a light receiving face; and
a both-side telecentric optical system that forms an image of the tablets located in the inspection area onto the imaging element, wherein
the light receiving face and a principal plane of the both-side telecentric optical system are set to satisfy Scheimpflug condition relative to the tablets located in the inspection area.

2. The appearance inspection device according to claim 1, wherein
the tablets are conveyed while being contained in containing recesses that are provided in the container film to open to the first face and to expand toward the second face.

3. The appearance inspection device according to claim 1, wherein
three or more of the imaging devices are placed around the inspection area on the second face of the container film.

4. A blister packaging machine comprising
the appearance inspection device according to claim 1.

5. A blister packaging machine comprising
the appearance inspection device according to claim 2.

6. A blister packaging machine comprising
the appearance inspection device according to claim 3.

7. The appearance inspection device according to claim 1, wherein the both-side telecentric optical system integrally comprises an object-side lens, an aperture diaphragm, and an imaging-side lens.

8. The appearance inspection device according to claim 7, wherein
the object-side lens collects a reflected light from the tablets,
the imaging-side lens focuses the reflected light transmitted from the object-side lens through the aperture diaphragm and forms the image onto the light receiving face of the imaging element, and
an optical axis of the object-side lens and the imaging-side lens is parallel to a principal ray of the reflected light.

* * * * *